United States Patent [19]

Smith, Jr. et al.

[11] 4,381,944
[45] May 3, 1983

[54] SUPERALLOY ARTICLE REPAIR METHOD AND ALLOY POWDER MIXTURE

[75] Inventors: Murray S. Smith, Jr., Cincinnati; Mark S. Hilboldt, Fairfield, both of Ohio; Thirmaleshwara A. Bhat, Albuquerque, N. Mex.

[73] Assignee: General Electric Company, Cincinnati, Ohio

[21] Appl. No.: 383,078

[22] Filed: May 28, 1982

[51] Int. Cl.³ ............... B23P 6/04; B23K 1/04; B22F 7/02

[52] U.S. Cl. .................. 75/255; 75/246; 228/119; 228/194; 29/402.18; 419/6

[58] Field of Search ......... 75/255, 251, 246, 208 R; 228/119, 194; 29/402.18, 402.07; 428/678

[56] References Cited

U.S. PATENT DOCUMENTS

| | | | |
|---|---|---|---|
| 3,073,269 | 1/1963 | Hoppin et al. | 148/22 |
| 3,108,861 | 10/1963 | Cape | 228/194 |
| 3,155,491 | 11/1964 | Hoppin et al. | 75/255 |
| 3,197,858 | 8/1965 | Feduska | 228/194 |
| 3,260,505 | 7/1966 | Snyder | 75/255 |
| 3,632,319 | 1/1972 | Hoppin | 228/194 |
| 3,692,501 | 9/1972 | Hoppin | 428/678 |
| 3,717,442 | 2/1973 | Knopp | 75/208 R |
| 4,008,844 | 2/1977 | Dovall | 228/194 |
| 4,098,450 | 7/1978 | Keller et al. | 228/119 |
| 4,176,433 | 12/1979 | Lee | 228/119 |
| 4,285,459 | 8/1981 | Baladjanian et al. | 228/119 |
| 4,299,629 | 11/1981 | Haack | 75/251 |

OTHER PUBLICATIONS

"Guide to Selection of Superalloys", *Metal Progress*, Mid-Jun. 1978, pp. 106-107.

*Primary Examiner*—M. J. Andrews
*Assistant Examiner*—J. J. Zimmerman
*Attorney, Agent, or Firm*—Lee H. Sachs; Derek P. Lawrence

[57] ABSTRACT

A powder alloy mixture for use in a method of repairing high temperature superalloy articles includes a first, higher temperature alloy powder in the range of about 35–65 weight percent of the mixture. The first alloy powder is based on at least one element selected from Ni and Co and is characterized as having good strength and environmental resistance along with the substantial absence of melting point depressant elements selected from Si and B in amounts greater than about 1% Si and 0.5% B. The second alloy powder is of a lower melting temperature alloy of Ni—Cr—Si—B—Co and is characterized by the substantial absence of C.

13 Claims, 1 Drawing Figure

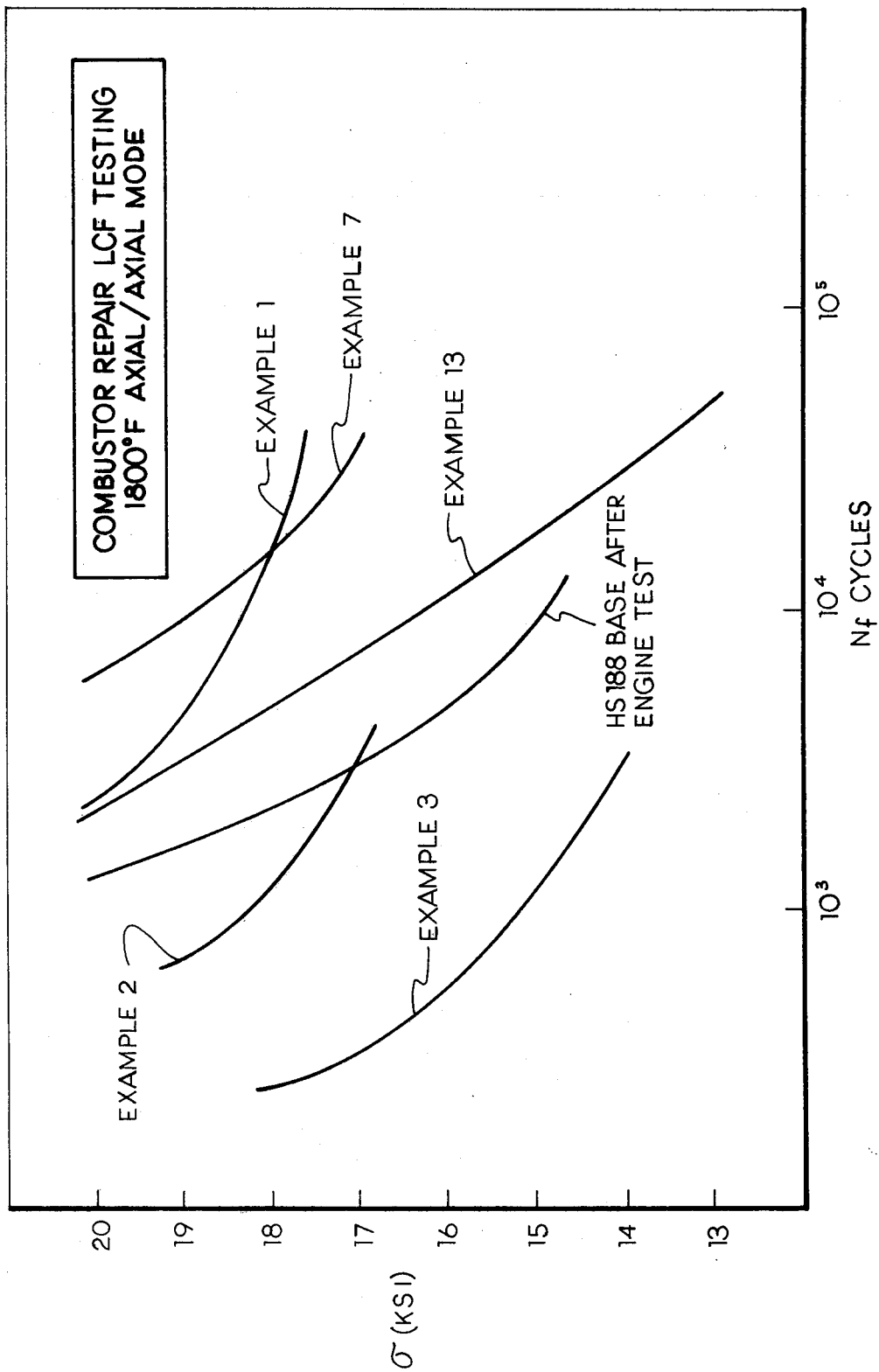

SUPERALLOY ARTICLE REPAIR METHOD AND ALLOY POWDER MIXTURE

CROSS REFERENCE TO RELATED APPLICATION

This application relates to copending and concurrently filed application Ser. No. 383,077, entitled "Homogenous Alloy Powder and Superalloy Article Repair Method".

BACKGROUND OF THE INVENTION

1. Field of the Invention

This invention relates to the repair of superalloy articles and, more particularly, to a method and alloy powder mixture for the repair of nickel-base and cobalt-base superalloy articles.

2. Description of the Prior Art

A variety of high temperature superalloys of the nickel-base or cobalt-base types are used in a variety of components in the high temperature operating section of gas turbine engines. As a result of the strenuous operating conditions, damage or deterioration in the form of cracks or other discontinuities, including other openings, can occur such as from thermal cycling or impact from airborne foreign objects or their combinations. In other instances, cracks in such high temperature superalloy components can occur during their manufacture. Because of the relatively high cost of such superalloy components, it is desirable to repair rather than to replace such articles.

One method for cleaning and repairing superalloy articles is described in U.S. Pat. No. 4,098,450-Keller et al issued July 4, 1978 and assigned to the assignee of the present invention. Described is a method using fluoride ions to contact oxide in a narrow crack or crevice to convert the oxide to gaseous fluoride. Subsequently, in one form of the invention, a repair alloy is applied to repair the crack or crevice.

In other repair methods which have been used for many years in the gas turbine engine art, oxides have been removed from parts to be repaired by mechanical means, or, predominantly in the case of cobalt-base alloys, through the use of hydrogen prior to application of a brazing alloy of the single alloy or wide-gap brazing mixture type. Such wide-gap brazing alloys have been described in the art, for example in U.S. Pat. No. 3,155,491-Hoppin et al issued Nov. 3, 1964.

Currently in use in gas turbine engines are cobalt-base alloy combustors one type of which is made from a cobalt-base alloy commercially available as HS188 alloy and consisting nominally, by weight, of 0.1% C, 22% Ni, 3.5% Fe, 22% Cr, 2% Mn, 0.4% Si, 15.5% W with the balance Co and incidental impurities. It has been observed that such a combustor can develop a number of small cracks while in or resulting from strenuous service. Currently, such cracks are repaired by welding. Sometimes repetitive repair welds are necessary in the same area because cracking also can occur during the repair operation. Heretofore, a powder alloy system capable of being used to repair such cracks by a method similar to vacuum brazing has not been reported.

SUMMARY OF THE INVENTION

It is a principal object of this invention to provide an improved alloy powder mixture which can be used in the repair of cracks or discontinuities in the surface of or through nickel-base or cobalt-base superalloy articles.

It is another object of the present invention to provide a method for using such a powder mixture in the repair of superalloy articles.

These and other objects and advantages will be more fully understood from the following detailed description, the drawing and the examples, all of which are intended to be typical of rather than in any way limiting on the scope of the present invention.

Briefly, the powder mixture of the present invention is a mixture of a first and a second alloy powder in the range of about 35–65 weight percent of the first alloy powder and 35–65 weight percent of the second alloy powder. The first alloy powder is characterized as having good strength and environmental resistance and the substantial absence of melting point depressant elements selected from Si and B in amounts greater than about 1% Si and 0.05% B. The first alloy powder has a melting point greater than the second alloy powder and comprises, by weight, about 0.01–0.65% C, 19–27% Cr, 0.2–16% W, up to 10% Mo, up to 20% Fe, up to 4% Ta, up to 1% Ti, up to 1% Zr, up to 0.5% La, up to 2% Mn, with the balance at least one element selected from Ni and Co, along with incidental impurities. The second alloy powder is a Ni—Cr—Si—B—Co alloy characterized by the substantial absence of C beyond impurity levels and consisting essentially of, by weight, about 8–18% Cr, 2–6% Si, 1–5% B, 10–30% Co, up to about 5% Fe with the balance essentially Ni and incidental impurities.

The method of the present invention includes providing such an alloy powder mixture, cleaning the article at least in the portion to be repaired, applying the mixture to the cleaned portion of the article and then heating the powder mixture and the article in a vacuum at a temperature at which the second alloy powder will melt but at which the first alloy powder will not melt completely, for at least about $\frac{1}{2}$ hour and preferably about $1\frac{1}{2}$ to $2\frac{1}{2}$ hours to allow interdiffusion to occur between the alloy powders.

BRIEF DESCRIPTION OF THE DRAWING

The drawing is a graphical comparison of low cycle fatigue properties of the present invention with that of other materials.

DESCRIPTION OF THE PREFERRED EMBODIMENTS

As can be appreciated from the cost of high temperature operating gas turbine engine components, in many cases it is more economical to repair such a component rather than to replace it after wear or damage during operation. An example is the repair of combustors of the above-described HS188 cobalt-base alloy. One such combustor configuration is shown in U.S. Pat. No. 3,845,620-Kenworthy, issued Nov. 5, 1974. Currently cracks in combustors are repaired by welding, which frequently requires repetitive operations in certain specific areas because additional cracking can occur during the repair welding operation. The present invention provides an improved repair method and material to extend the service life of such an article at a reduced cost over present repair methods and over replacement of such a component.

During the evaluation of the present invention, a wide variety of alloy powders with potential for use as the high temperature component (first alloy powder) of the mixture, and a wide variety of other alloy powders with potential for use as the lower temperature component (second alloy powder) of the mixture, were studied. Because the second alloy powder is the lower temperature component, it can be compared with a brazing alloy. Therefore, a number of currently available brazing alloys were included in sample mixtures.

The present invention recognizes that the combination of a first, high temperature alloy powder with a second, lower temperature powder in a particular mixture promotes melting and associated flow of the second alloy powder to enable second alloy powder flow into tight cracks at a selected repair temperature. However, the combination should not result in diffusion between the two alloy powders to the extent that the melting temperature of the first alloy powder is reduced to the selected repair temperature. One feature of the present invention is that heating of the powder mixture at the repair temperature results in melting of the second alloy powder but no more melting than incomplete melting of the first alloy powder. As can be appreciated, use of highly effective melting point depressant elements such as Si and B must be controlled carefully between the two alloy powders of the mixture. The present invention specifies the substantial absence of those melting point depressants in the first alloy powder in amounts greater than normal impurity levels in high temperature superalloys, and specifically includes those two melting point depresssant elements in substantial amounts in the second alloy powder. In this way, a critical combination of elements is included in each of the first and second alloy powders which together are coordinated to provide a combination of strengh and environmental resistance properties as well as compatibility between the powders, primarily based on their melting temperatures ranges.

Selection of the first alloy powder and the second alloy powder as well as the relative combination of the two in the mixture is dependent, at least in part, on the type of article to be repaired. For example, if an article such as a combustor has been manufactured by brazing various parts together, the remelt temperature of the brazed joints existing and predetermined in the article will dictate that the selected repair temperature be below such brazed joint remelt temperature to maintain integrity of the article being repaired. For example, in one combustor made predominantly of the above-described commercially available HS188 alloy, which has a melting temperature of about 2375°-2425° F. there was a brazed joint having a remelt temperature of about 2175°-2200° F. Therefore, the repair temperature for such combustor was selected to be about 2150° F., below that brazed joint remelt temperature and within the preferred repair temperature of about 2100°-2200° F. Thus, many of the tests described below were conducted with that 2150° F. repair temperature in mind. However, it will be understood by those skilled in the art that other repair temperatures can be selected within the scope of the present invention in connection with that or other articles.

The following Tables I and II identify the composition ranges of first alloy powders and second alloy powders which can be used in accordance with the present invention. Unless otherwise stated, percentages herein are by weight.

TABLE I

FIRST ALLOY POWDER
(wt % - with incidental impurities)

|    | X-40    | HASTELLOY X (HX) | MAR-M-509 | HS188   | L605    |
|----|---------|------------------|-----------|---------|---------|
| C  | .45–.55 | .05–.15          | .55–.65   | .05–.15 | .15 max |
| Cr | 24.5–26.5 | 20.5–23.       | 23.–24.3  | 20–24   | 19–21   |
| W  | 7–8     | 0.2–1.           | 6.5–7.5   | 13–16   | 14–16   |
| Ni | 9.5–11.5 | Bal             | 9–11      | 20–24   | 9–11    |
| Co | Bal     | 0.5–2.5          | Bal       | Bal     | Bal     |
| Mo |         | 8–10             |           |         |         |
| Fe | 2 max   | 17–20            | 2 max     | 3.5 max | 3 max   |
| Si |         | 1. max           | 0.3 max   | 0.2–0.5 | 0.4 max |
| B  |         | .008 max         | 0.01 max  |         |         |
| Ta |         |                  | 3–4       |         |         |
| Ti |         |                  | .15–.25   |         |         |
| Zr |         |                  | 0.3–0.5   |         |         |
| La |         |                  |           | .03–.15 |         |
| Mn |         |                  |           |         | 1–2     |

TABLE II

SECOND ALLOY POWDER
(wt % - Balance Ni and incidental impurities)

|    | BROAD RANGE | PREFERRED RANGE | 915E   |
|----|-------------|-----------------|--------|
| Cr | 8–18        | 12–14           | 12–14  |
| Fe | 0–5         | 0–4             |        |
| Si | 2–6         | 3–5             | 3–5    |
| B  | 1–5         | 2–3             | 2.5–3  |
| Co | 5–30        | 15–25           | 18–22  |

Table I represents examples of the first alloy powder, which is the high temperature component of the mixture of the present invention, within the range, by weight, of 0.01–0.65% C, 19–27% Cr, 0.2–16% W, up to 10% Mo, up to 20% Fe, up to 4% Ta, up to 1% Ti, up to 1% Zr, up to 0.5% La, up to 2% Mn with the balance at least one of Ni and Co, along with incidental impurities. In addition, the very effective melting point depressant elements Si and B are limited to no more than 1% Si and no more than 0.05% B, normal impurity levels for such alloys. As has been mentioned, selection of the first, high temperature powder component of the mixture of the present invention is based on the intended repair temperature as well as the strength and environmental resistance of the powder. In addition, the first powder is selected as one which can have its melting point reduced by interdiffusion with a second, lower temperature powder but not reduced as low as the repair temperature selected.

Selection of the second, low temperature powder component of the mixture is based on its compatibility with the first, high temperature powder, for example in respect to flow and interdiffusion characteristics. In addition, the second alloy powder includes Cr for oxidation resistance, along with the very effective melting point depressant elements Si and B. Co is included in the range of 5–30% for strength and to assist in compatibility with Co base alloys. It has been recognized in connection with the composition of the second alloy powder that less than about 8% Cr does not provide significant contribution to oxidation resistance and greater than about 18% Cr can lead to the formation of intermetallics and to brittleness. The effective range of the optional Fe, included for assistance in melting, has been established as up to about 5% because greater than about that amount can be detrimental to oxidation resistance. The significant melting point depressant elements Si and B, both of which are included in the second alloy powder, are in the range of 2–6% Si and 1–5% B. It has been recognized that because Si can lead to brittleness and no more significant benefit is achieved with amounts greater than about 6%, the upper limit has been established at about 6%. In the case of B, greater than about 5% in a nickel-base provides no additional benefit in the present invention.

Table III identifies the nominal compositions of another alloy powder (915) and certain commercially available brazing alloy powders which are evaluated as the lower temperature component of a powdered mixture in comparison with the second alloy powder of the present invention, identified in Table II.

TABLE III

OTHER ALLOY POWDERS
(nominal wt % - balance Ni and incidental impurities)

|    | 775 | CM50 | B-93 | N-125 | 915  |
|----|-----|------|------|-------|------|
| C  |     |      |      | 0.75  |      |
| Cr | 15  |      | 14   | 16.5  | 12–14|
| Fe |     |      |      |       | 3–5  |
| Si |     | 3.5  | 4.5  | 4     | 3–5  |
| B  | 3.5 | 1.8  | 0.7  | 3.8   | 2–3  |
| Co |     |      | 9.5  |       |      |
| W  |     |      | 4    | 4     |      |
| Mo |     |      | 4    |       |      |
| Ti |     |      | 4.9  |       |      |
| Al |     |      | 3    |       |      |

Some comparison data for tensile and oxidation testing are shown in the following Tables IV and V. In Table IV, example 1 represents a powder mixture which includes a nickel-base first alloy powder, and examples 7 and 8 represent a powder mixture which includes a cobalt-base first alloy powder, all within the scope of the mixture of the present invention. The tensile data of Table IV were obtained from tests on 0.010 inch butt joint sheet specimens which had been prepared by processing at a repair temperature of 2150° F. for two hours in vacuum. These data clearly show the superiority of the average room temperature ultimate tensile strength and ductility using powder mixtures of the present invention, as represented by examples 1, 7 and 8, for joining or repair of a typical combustor material, HS188 alloy. As used herein, "ksi" means "thousands of pounds per square inch".

for example 13 were processed for two hours at 2200° F. because of the melting characteristics of the lower melting temperature powder. Example 13 was butt bonded using a mixture of 15 weight percent of a high temperature alloy powder identified as Rene' 80 alloy and described in U.S. Pat. No. 3,615,376-Ross, patented Oct. 26, 1971, along with 85 weight percent of brazing alloy B-93 identified in the above Table III. For comparison purposes, the LCF data for base sheet alloy HS188, from which the specimens were made, also are included in the drawing. The data in the drawing clearly show the superiority of the LCF data for the mixtures of Examples of 1 and 7, within the scope of the present invention, over the other materials tested. Although the mixture of example 2, exhibited improved tensile properties as shown in Table IV and excellent oxidation resistance as shown in Table V, it had much lower LCF strength, apparently from the absence of Co: the principal compositional difference between 915 and 915E in the Co content.

TABLE V

POWDER MIXTURE 1800° F. OXIDATION DATA
AFTER 200 HOURS EXPOSURE IN AIR

| Ex. | Powder Mixture (by wt.) | Penetration Max. (Inches) | Type | Remarks |
|-----|-------------------------|---------------------------|------|---------|
| 10  | 45% Hx/55% N125         | .010                      | Entire surface | High Porosity-unacceptable |
| 11  | 65% Hx/35% 915          | .001                      | Few, isolated | Acceptable |
| 12  | 55% Hx/45% 915E         | .003                      | Few, isolated | Acceptable |
| 13  | 15% Rene' 80/85% B93    | .010                      | Entire surface | Unacceptable |
| 14  | 50% X40/50% 915E        | .002                      | Few, isolated | Acceptable |

Table V presents a comparison of oxidation data for a series of powder mixture examples, including examples 12 and 14 within the scope of the present invention. Specimens used in oxidation testing were 0–0.040" variable gap flow-through specimens. The mixture used in example 10 had a general penetration over the entire surface, and high porosity apparently from the high carbon content at 0.75 wt. % in N125 brazing alloy, as

TABLE IV

AVERAGE ROOM TEMPERATURE TENSILE DATA
0.010" BUTT JOINT SHEET SPECIMENS AFTER 2150° F./2 Hrs.
(A = HS188 BASE; B = HASTELLOY X BASE)

| Ex. | Powder Mixture (by wt) | STRENGTH (ksi) UST A | B | .2% Yield A | B | .02% Yield A | B | % ELONGATION (by gage) BASE A 0.5" | 1" | 2" | BASE B 0.5" | 1" | 2" |
|---|---|---|---|---|---|---|---|---|---|---|---|---|---|
| 1 | 55% 915E/45% Hx | 74.9 |  | 58.7 |  | 48.1 |  | 3.7 | 3.0 | 3.3 |  |  |  |
| 2 | 60% 915/40% Hx  | 71.3 | 58.1 | 57.6 | 42.4 | 47.8 | 33.3 | 4.5 | 3.0 | 2.2 | 3.0 | 3.5 | 3.3 |
| 3 | 55% 775/45% Hx  | 38.4 |  | (b) |  | (b) |  |  |  |  |  |  |  |
| 4 | 75% B93/25% Hx  | 49.5 |  | (b) |  | 47.8 |  |  |  |  |  |  |  |
| 5 | 60% CM50/40% Hx | 59.4 | 55.7 | 57.9 | 42.0 | 49.6 | 32.2 |  |  |  | 3.0 | 2.5 | 2.8 |
| 6 | 45% N-125/55% Hx (a) |  | 64.2 |  | 42.6 |  | 33.3 |  |  |  | 6.0 | 8.0 | 7.0 |
| 7 | 50% 915E/50% X-40 | 72.4 |  | 62.2 |  | 51.6 |  |  | 1.8 |  |  |  |  |
| 8 | 55% 915E/45% X-40 | 74.8 |  |  |  | 48.1 |  |  | 3.6 |  |  |  |  |
| 9 | HS188 Base (c)  | 128.2 |  | 54.3 |  | 46.0 |  |  | 69.2 |  |  |  |  |

(a) Hot isostatically pressed before testing to close any porosity
(b) Failed before 0.2% yield point
(c) Sheet material, no joint, tested after 2150° F./2 hrs The drawing shows additional comparative data in a graphical presentation of low cycle fatigue (LCF) testing of flat sheets of about 0.06–0.08 inch thick which had been butt bonded and processed in vacuum. Specimens used for testing of examples 1, 2, 3 and 7 were processed at 2150° F for two hours whereas specimens shown in above Table III. Therefore, it was unacceptable. Similarly, the mixture of example 13 was unacceptable because of the general and extensive penetration over the entire surface. However, as shown by the data related to examples 12 and 14, those forms of the present invention had excellent oxidation resistance. Example 11 also had excellent oxidation resistance, but had low LCF as shown by the drawing. The present invention, represented by the mixture of examples 1 and 7, shows adequate to excellent creep properties for repair use, as presented in Table VI. By way of comparision, an average 1% creep life for the HS188 base metal was 190 hours.

TABLE VI

HS188 ALLOY SHEET SPECIMENS,
0.010" BUTT JOINT
CREEP DATA
TESTS AT 1700° F. and 6 ksi

| Example | Powder Mix | | Total Time |
|---|---|---|---|
| | | 1% Creep (hrs) | |
| 7 | 50% 915E/50% X-40 | 158 (a) | 405 hrs |
| | | 122 | 235 hrs |
| | | 112 | 162 hrs |
| | | 0.8% Creep (hrs) | |
| 1 | 55% 915E/45% Hx | 120 (b) | |
| | | 104 (b) | |

(a) 1.15% creep
(b) failed, 0.8% creep reached

TABLE VII

POWDER MIXTURE MELTING CHARACTERISTICS
at 2150° F. - 2 hrs - vacuum

| 1st Powder | | 2nd Powder | | Meets 2150° F. Melting | |
|---|---|---|---|---|---|
| Name | % | Name | % | Requirements | Flow |
| Hastelloy X | 35 | 915E | 65 | Yes | Good |
| (Ni Base) | 40 | " | 60 | Yes | Good |
| | 45 | " | 55 | Yes | Good |
| | 50 | " | 50 | No | Poor |
| X-40 | 40 | " | 60 | Yes | Good |
| (Co-base) | 45 | " | 55 | Yes | Good |
| | 50 | " | 50 | Yes | Good |
| | 55 | " | 45 | Yes | Good |
| | 60 | " | 40 | Yes | Good |
| | 65 | " | 35 | Yes | Fair |
| Hastelloy X | 35 | 915 | 65 | Yes | Good |
| | 40 | " | 60 | Yes | Good |
| | 50 | " | 50 | No | Poor |
| | 60 | " | 40 | No | Poor |
| X-40 | 40 | " | 60 | Yes | Poor |
| | 42.5 | " | 57.5 | Yes | None |
| | 45 | " | 55 | Yes | None |

As was mentioned above, once a repair temperature has been selected, for example based upon the structure and fabrication of the component or article to be repaired, the melting characteristics of the powder mixture must be determined. This is necessary to verify that good flow of the second alloy powder can occur at that repair temperature without fully melting the first, higher temperature alloy powder. Table VII presents powder mixture melting characteristics determined at 2150° F. for two hours in vacuum. It should be noted that the form of the mixture of the present invention, represented by use of 915E alloy as the second alloy powder within the range of 35-65 weight percent of the mixture, allows good flow depending on the first powder used, for example at a 2150° F. repair temperature. It should be understood that selection of different alloy powders within the scope of the mixture of the present invention could be based on other flow characteristics and can vary with the amount and the kind of first powder used.

The mixture of the present invention provides a repair material resulting in a repaired structure having an improved combination of strength and environmental resistance. Although the alloy powder size is not critical within ordinary limits, for example it can be within the range of about −120 to +325 mesh size, it is advantageous to have substantially the same size for both the first and the second alloy powders. Otherwise, the mixtures can become nonuniform, such as by settling during handling.

The method of the present invention includes cleaning the article at least in the portion to be repaired, such as through the use of hydrogen, fluoride ion, acid, etc. Thereafter, the alloy powder mixture of the present invention is applied to the cleaned portion of the article which then is heated in a vacuum at a temperature at which the second alloy powder will melt but at which the first alloy powder will not melt completely. The time of heating is at least about one-half hour, thus distinguishing this method from the usual brazing method in which adequate heating and melting is accomplished in about 10 minutes. The additional heating beyond 10 minutes is required according to the method of the present invention to enable diffusion between the powders and flow into cracks or surface discontinuities being repaired. In this way, cracks up to about 0.06" in width are readily repaired. It is preferred that the time for such heating be in the range of about 1½ to 2½ hours to allow interdiffusion to occur between the alloy powders.

To show the integrity of the repair made in accordance with the present invention, a combustor made of HS188 alloy was repaired in one area by welding and in another area adjacent the welded area through use of the mixture of example 1 shown in Table IV above. The repairs were made on small (about ½") cracks. The combustors were tested in a cyclic engine test, sometimes identified as "C" cycles, for 675 cycles after which they were inspected. It was observed that none of the cracks broke through the joint repaired according to the present invention. One crack ran from the repaired area into the base metal apparently because it was forced into a weaker material. About 50% of the weld repaired areas, which constituted most of the repaired portion of the combustor, recracked in the weld during this engine test.

Although the present invention has been described in connection with specific examples and alloy sheet specimens, it will be understood by those skilled in the art that the present invention is capable of variations and modifications within the scope of the invention as represented by the appended claims.

What is claimed is:
1. A mixture of a first alloy powder and a second alloy powder;
the first alloy powder characterized as having good strength and environmental resistance and the substantial absence of melting point depressant elements selected from the group consisting of Si and B in amounts greater than, by weight, 1% Si and 0.05% B;
the first alloy powder consisting essentially of, by weight, 0.01–0.65% C, 19–27% Cr, 0.2–16% W, up to 10% Mo, up to 20% Fe, up to 4% Ta, up to 1% Ti, up to 1% Zr, up to 0.5% La, up to 2% Mn, with the balance incidental impurities and at least one element selected from the group consisting of Ni and Co;
the second alloy powder being of a Ni-Cr-Si-B-Co base alloy with a melting temperature lower than that of the first alloy powder and consisting essen- tially of, by weight, about 8–18% Cr, 2–6% Si, 1–5% B, 10–30% Co, up to about 5% Fe, with the balance Ni and incidental impurities, and further characterized by the substantial absence of C in amounts greater than an impurity level;

the mixture consisting essentially of, by weight, 35–65% of the first alloy powder and 35–65% of the second alloy powder.

2. The mixture of claim 1 in which the first alloy powder has a melting temperature greater than about 2150° F. and consists essentially of, by weight, 0.05–0.55% C, 20–27% Cr, 0.2–8% W, up to 10% Mo, up to 20% Fe, with the balance Ni, Co and incidental impurities.

3. The mixture of claim 2 in which the first alloy powder includes Ni in the range of about 9–12 weight percent, the first alloy powder being about 45–50 weight percent of the mixture.

4. The mixture of claim 2 in which the first alloy powder includes Co in the range of about 0.5–3 weight percent, the first alloy powder being about 40–45 weight percent of the mixture.

5. The mixture of claim 1 in which the second alloy powder consists essentially of, by weight, 12–14% Cr, 3–5% Si, 2–3% B, 15–25% Co, up to about 5% Fe, with the balance Ni and incidental impurities, the second alloy being about 50–60 weight percent of the mixture.

6. The mixture of claim 5 in which the second alloy includes Co in the range of about 18–22 weight percent.

7. The mixture of claim 1 in which:
the first alloy powder has a melting temperature greater than about 2150° F. and consists essentially of, by weight, 0.05–0.15% C, 20–23% Cr, 0.2–1% W, 8–10% Mo, 17–20% Fe, 0.5–3% Co, with the balance Ni and incidental impurities; and
the second alloy powder consists essentially of, by weight, 12–14% Cr, 3–5% Si, 2.5–3% B, 18–22% Co, with the balance Ni and incidental impurities, the second alloy powder being about 55 weight percent of the mixture.

8. The mixture of claim 1 in which:
the first alloy powder has a melting temperature greater than about 2150° F. and consists essentially of, by weight, 0.45–0.55% C, 24–27% Cr, 7–8% W, up to about 2% Fe, 9–12% Ni, with the balance Co and incidental impurities; and
the second alloy powder consists essentially of, by weight, 12–14% Cr, 3–5% Si, 2.5–3% B, 18–22% Co, with the balance Ni and incidental impurities, the second alloy power being about 55 weight percent of the mixture.

9. A method for repairing a superalloy article comprising the steps of:
providing the powder mixture of claim 1 of the first alloy powder and the second alloy powder;
cleaning the article at least in an article portion to be repaired;
applying the powder mixture to the article portion; and then,
heating the powder mixture and at least the article portion in a vacuum at a temperature at which the second alloy powder will melt but at which the first alloy powder will not melt completely;
the heating being conducted for at least ½ hour to allow interdiffusion to occur between the alloy powders.

10. The method of claim 9 for repairing a superalloy article including a brazed joint having a predetermined remelt temperature, wherein the heating is conducted at a temperature less than the brazed joint remelt temperature.

11. The method of claim 10 in which:
the powder mixture is in the mixture of claim 2; and
the heating is conducted at a temperature in the range of 2100°–2200° F.

12. The method of claim 10 in which:
the powder mixture is the mixture of claim 7; and
the heating is conducted at about 2150° F. for about 1½ to 2½ hours.

13. The method of claim 10 in which:
the powder mixture is the mixture of claim 8; and
the heating is conducted at about 2150° F. for about 1½ to 2½ hours.

* * * * *